United States Patent [19]
LaMorte et al.

[11] Patent Number: 5,201,136
[45] Date of Patent: Apr. 13, 1993

[54] ARTIFICIAL FISH HABITAT STRUCTURES

[76] Inventors: David L. LaMorte, 2031 E. Gary Cir., Mesa, Ariz. 85213; Robert L. Hirsch, 6447 E. Lone Mountain, Cave Creek, Ariz. 85331

[21] Appl. No.: 469,034

[22] Filed: Jan. 23, 1990

[51] Int. Cl.⁵ .................... A01K 97/04; A01K 61/00
[52] U.S. Cl. ........................................ 43/4; 119/3; 43/41
[58] Field of Search ............ 43/4, 41, 4.5, 43.1; 119/3

[56] References Cited

U.S. PATENT DOCUMENTS

| | | | |
|---|---|---|---|
| 3,124,892 | 3/1964 | O'Brien | 43/43.1 |
| 3,561,402 | 2/1971 | Ishida | 119/3 |
| 3,898,958 | 8/1975 | Pranis | 119/3 |
| 3,933,124 | 1/1976 | Ledoux | 119/3 |
| 4,095,560 | 6/1978 | Laurie | 119/3 |
| 4,196,694 | 4/1980 | Buchanan | 119/3 |
| 4,441,453 | 4/1984 | McMickle | 119/3 |
| 4,475,301 | 10/1984 | Wortham | 43/41 |
| 4,594,965 | 6/1986 | Asher | 119/3 |
| 4,736,708 | 4/1988 | Yoder | 119/3 |
| 4,872,782 | 10/1989 | Streichenberger | 119/3 |
| 4,903,429 | 2/1990 | Tetenes | 43/55 |

Primary Examiner—Kurt Rowan
Attorney, Agent, or Firm—Don J. Flickinger; Jordan M. Meschkow

[57] ABSTRACT

A variety of fish habitat structures are provided for simulating a natural aquatic environment. A first structure is in the form of a horizonatally extending tube made from plastic mesh. A pair of concrete cinder blocks is placed in the opposite open ends of the tube to weight the tube so that it remains on the floor of the environment. The clearance between the tops of the blocks and the circumference of the tube is sufficient to allow spawning bass to enter the tube while keeping out larger predatory species of fish. A second structure is in the form of a pyramid-shaped stack of solid tubes, each of which is closed at one end and open at the other. The diameter of the tubes is selected to accommodate spawning catfish. A third structure, which simulates a brush pile, is a mesh tube, similar to the first structure, turned on one end so that its longitudinal axis extends vertically. A cinder block at the bottom end of the tube prevents it from going adrift. A conical cap at the top end prevents large fish from entering. The cap can also be buoyantly supported by a flexible stem to make the fourth structure, which provides overhead cover for predatory fish.

18 Claims, 2 Drawing Sheets

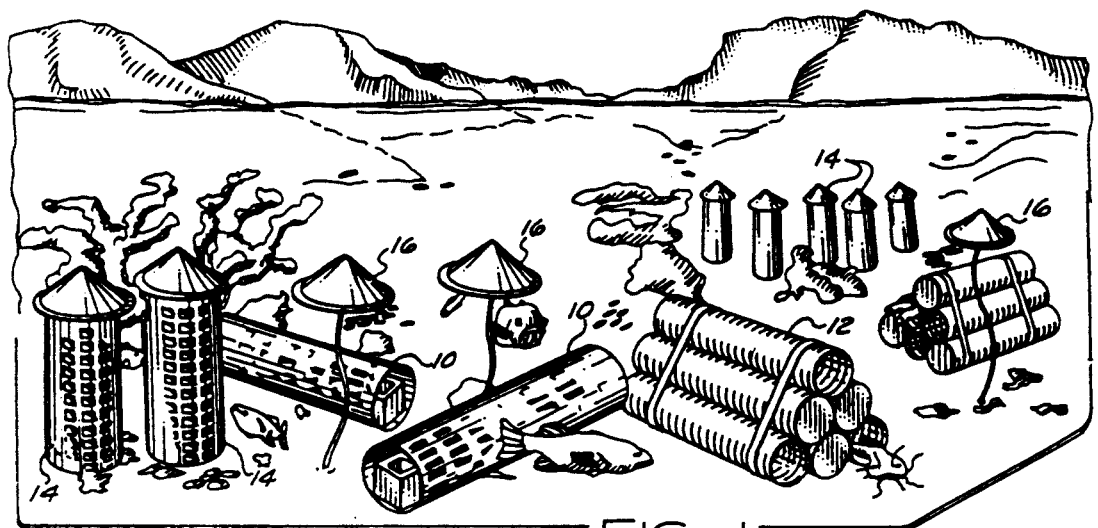
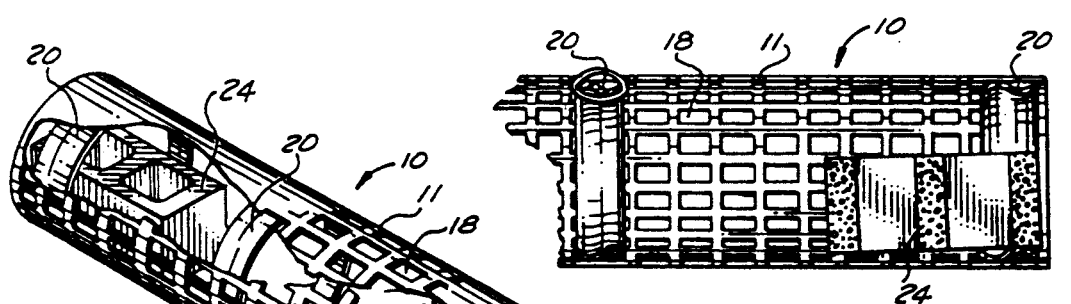
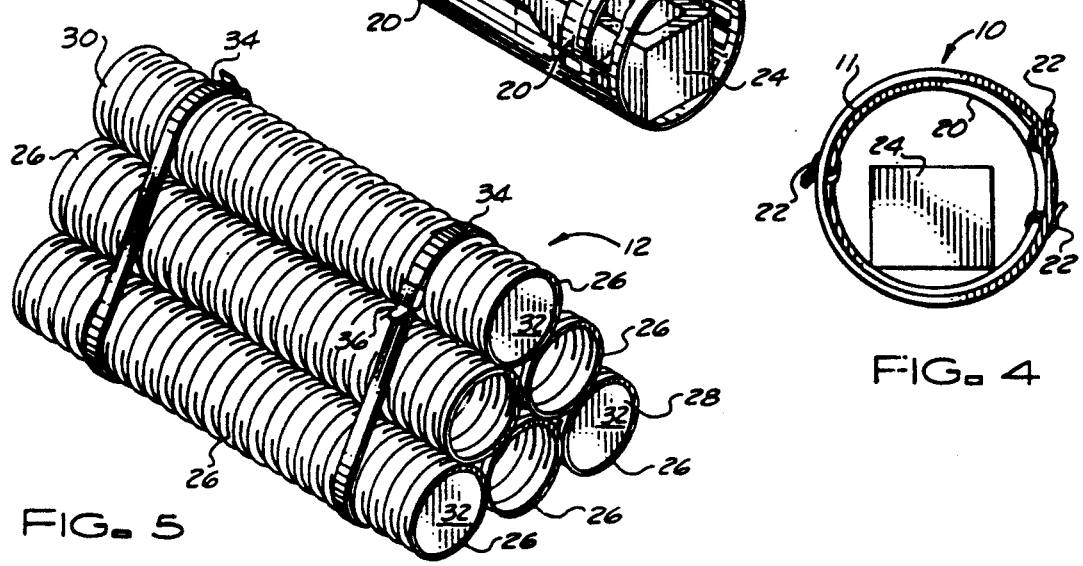

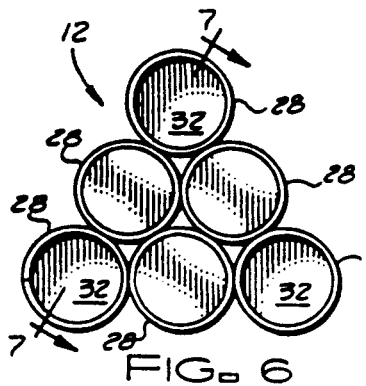
FIG. 6
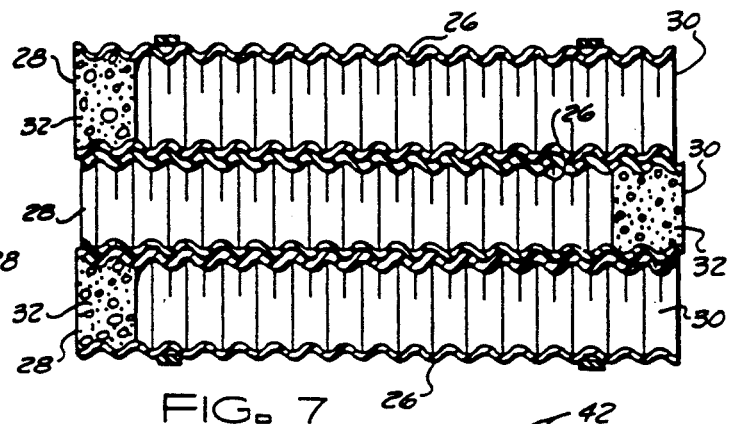
FIG. 7
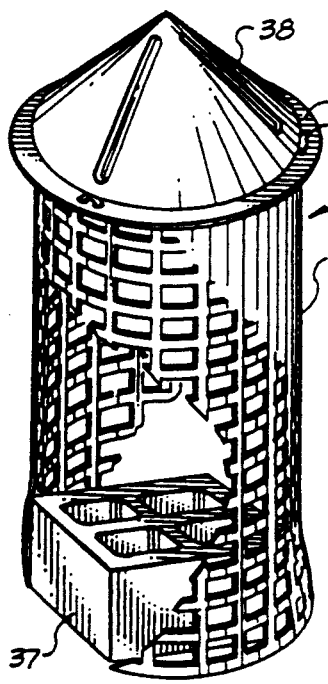
FIG. 8
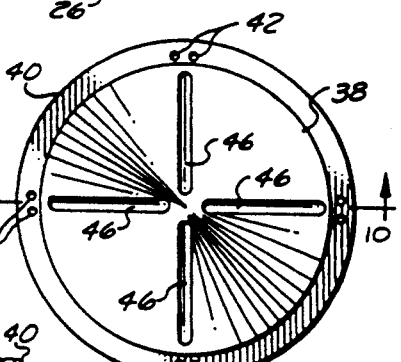
FIG. 9
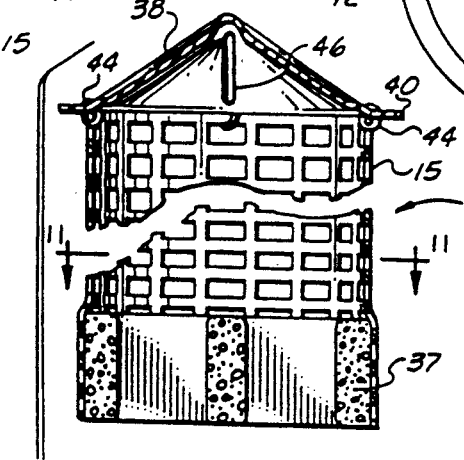
FIG. 10
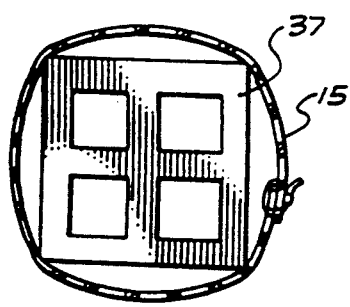
FIG. 11
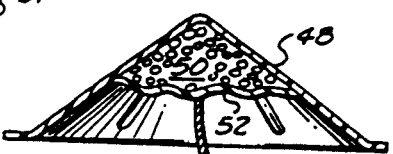
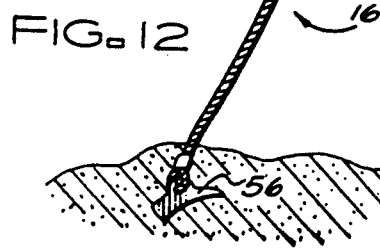
FIG. 12

ARTIFICIAL FISH HABITAT STRUCTURES

BACKGROUND OF THE INVENTION

1. Field of the Invention

This invention relates to the art of fish and game management.

More particularly, this invention relates to artificial fish habitats.

In a further and more specific aspect, the instant invention concerns a variety of underwater structures for sheltering targeted species of fish.

2. Description of the Prior Art

Fishermen over the years have observed that certain species of freshwater fish thrive in lakes having large amounts of underwater vegetation and other types of bottom cover. Certain types of cover make ideal hiding places for small fish escaping from predators, while other types of cover serve to conceal the larger, predatory fish as they are about to ambush their prey. Still other cover is preferred for activities such as spawning, resting, and feeding.

It has also been observed, conversely, that lakes and other aquatic systems having small amounts of bottom cover have smaller populations of fish. Fortunately, lakes having an inadequate amount of naturally occurring cover can be improved by artificial additions such as automobile tires, hardwood or softwood trees, and brush bundles. In addition, cobble and boulder beds or suspended boxes of gravel can be provided to increase the number of suitable spawning sites.

One problem with some of the commonly used habitat additions, such as trees and brush bundles, is that they deteriorate rapidly when submerged. Another problem is a tendency to drift away from their original locations. Drifting structures are difficult to monitor and sustain.

In response to the problem of deterioration, various attempts have been made to construct alternative habitats from modern plastics. One plastic fish habitat which has been successfully used in fisheries is a bass ambushing cover structure sold under the name "Fish 'N Tree" or "Fish 'N Forest" by Plastics Research and Development Corporation, a subsidiary of EBSCO. The "Fish 'N Tree" comprises a central stalk made from modular units measuring three feet long, with a number of flat, leaf-like structures extending radially outwardly from the stalk. When fastened to the bottom of an aquatic system, the stalk floats upwardly like kelp, thus providing security cover and ambush sites for large, predatory fish such as bass.

Although satisfactory for concealing large, predatory fish, structures such as the "Fish 'N Tree" do not meet all the life requirements of all species of fish. They do not provide adequate escape for small prey fish such as crappies; nor do they offer enough concealment for spawning. Accordingly, other types of structures are needed.

Therefore, it is an object of the present invention to provide a number of differing fish habitat structures for meeting various life requirements of different types of fish.

Another object of the invention is the provision of fish habitat structures which resist deterioration when submerged.

And another object of the invention is to provide adequately anchored fish habitat structures which do not go adrift when subjected to changing currents.

Still another object of the invention is the provision of artificial fish habitats for hiding small prey fish.

Yet another object of the invention is to provide darkened cavities for concealing spawning catfish.

Yet still another object of the invention is the provision of ambush sites for large predatory fish.

And a further object of the invention is to provide artificial fish habitat structures with sufficient surface area for algal attachment.

And still a further object of the invention is the provision of artificial fish habitat structures, according to the foregoing, which are relatively inexpensive to manufacture and simple to install.

SUMMARY OF THE INVENTION

Briefly, to achieve the desired objects of the instant invention in accordance with the preferred embodiment thereof, a number of artificial fish habitat structures are provided for satisfying various life requirements for various species of fish. Together, the various structures comprise a complete aquatic environment.

A first type of structure consists of a single tube placed on its side so that its longitudinal axis is generally parallel to the bottom surface of the lake or other aquatic system. The tube, made from a durable plastic, has plurality of openings extending over approximately 50 to 60% of its total surface area. A number of stiffener rings are provided at spaced intervals along the tube to prevent it from collapsing under pressure. Weighted blocks are placed in opposite ends of the tube to anchor it at the bottom of the lake, as well as to prevent very large fish from entering the tube. The purpose of this tube is to provide security for spawning adult fish, particularly bass, and hiding cover for fry.

A second type of structure is an artificial brush pile, which is formed by turning a mesh tube similar to the type described above on one end so that its longitudinal axis is generally perpendicular to the bottom of the lake. A conical cap is placed on the opposite end so that large fish can not enter through the top. A weighted block is secured to the bottom f the tube to anchor it to the bottom. The purpose of this structure is to provide escape and hiding cover for small fish.

Still another type of structure is formed by piling a plurality of solid tubes on top of one another to form a pyramid. Each tube has a plug at one end so that it can only be entered from one direction. Preferably, half of the plugged ends in the pyramid face in one direction, while the other half face the other direction, for a greater sense of isolation. This structure simulates the darkened cavities in which certain types of fish, particularly catfish, prefer to spawn.

Another structure is formed by attaching a conical cap to an elongated flexible stem which is anchored to the bottom of the lake. This structure, which resembles a mushroom, provides overhead cover and ambush cover for large species of fish.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a perspective view showing an underwater environment including the fish habitat structures of the instant invention.

FIG. 2 is a perspective view showing a spawning tube according to the present invention.

FIG. 3 is a fragmentary longitudinal sectional view taken through the spawning tube of FIG. 2.

FIG. 4 is an end view of the spawning tube of FIG. 2.

FIG. 5 is a perspective view showing a spawning colony according to a second embodiment of the invention.

FIG. 6 is an end view of the spawning colony shown in FIG. 5.

FIG. 7 is a longitudinal sectional view taken through line 7—7 of FIG. 6.

FIG. 8 is a perspective view showing a simulated brush bundle according to the present invention.

FIG. 9 is a top view of the simulated brush bundle shown in FIG. 8.

FIG. 10 is a fragmentary sectional view taken through line 10—10 of FIG. 9.

FIG. 11 is a sectional view taken through line 11—11 of FIG. 10.

FIG. 12 is a sectional view showing a structure for providing ambush cover according to the present invention.

DETAILED DESCRIPTION OF THE PREFERRED EMBODIMENT

Turning now to the drawings in which like reference characters indicate corresponding elements throughout the several views, attention is first directed to FIG. 1, which shows a complete underwater environment including several examples of each of the fish habitat structures according to the present invention. More specifically, the environment consists of a number of individual spawning tubes 10, also known as "Bass Bungalows", spawning colonies 12, known as "Cat Houses", a number of artificial brush piles 14, also known as "Crappie Condos", and several ambush cover structures 16, also known as "Magic Mushrooms". For best results, these structures should be placed along shorelines near existing vegetation or other artificial habitats such as "Fish 'N Forests" (not shown).

FIGS. 2-5 illustrate a spawning tube or "Bass Bungalow" 10, which provides security for spawning adult fish such as bass, as well as escape or hiding cover for fry. For optimum results, tubes of this type should be placed within 15 feet of natural beds of potemogeton waterweed.

The spawning tube 10 comprises a sheet 11 of heavy duty mesh material which has been rolled to form a hollow cylinder measuring approximately six feet in length and 15 to 18 inches in diameter. The openings 18 in the mesh material preferably measure from 1¼" by 2¼" to 1¾" by 2¾" in size in order to allow fry to pass freely in and out of the tube. In addition, the openings 18 should comprise no more than 40 to 50% of the total surface area of the tube 10, as the rest of the area is needed to allow attachment of periphyton algae.

The mesh material selected for the tube 10 should be non-corrosive, non-conductive, non-toxic, lightweight, chemical resistant, acid-resistant, salt and weather resistant, rust proof, durable, flexible and resilient. It should also be ultra-violet stabilized to resist deterioration in sunlight. One material known to possess all of the desired properties is high-density polyethylene of the type commonly used in snow-fencing. This material, which has an underwater life expectancy of at least 35 years, is also able to withstand temperatures in the range of −60 to +200 degrees Fahrenheit. In addition, it is heat-resealable, and does not unravel under stress.

A number of stiffening rings 20, preferably formed from sections of corrugated plastic pipe having an inner diameter of approximately 12 inches and an outer diameter of approximately 15 inches, are mounted within the tube 10 to prevent the mesh material from collapsing radially under pressure. Nylon wire fastener ties 22 are used to secure the stiffening ribs 20 to the mesh tube 10 as well as to tie the opposite longitudinal edges of the sheet 11 to one another so that the tube maintains its cylindrical shape. The ties 22, like the sheet material, should be ultraviolet stabilized to resist deterioration when exposed to sunlight, and should have a life expectancy of at least 35 years underwater.

The tube 10 is maintained in a horizontal position on the bottom of the lake by means of a pair of weights such as cinder blocks 24 which are placed at the opposite ends of the tube. The clearance between each of the blocks 24 and the circumference of the tube 10 is sufficient to allow adult bass to enter and exit the tube for spawning, and yet is small enough to keep out larger species of predatory fish.

Another type of spawning habitat 12, designed for catfish and other species which prefer to spawn in darkened cavities, is illustrated in FIG. 5. Habitats of this type, known as "Cat Houses", are preferably located near the shoreline, in about 10 feet of water. A minimum depth of 4 to 6 feet of water is required during spawning season.

The "Cat House" 12 comprises a number of corrugated pipes 26 bundled together to form a pyramid. In the illustrated embodiment, the pyramid consists of six pipes, with three on the bottom, two in the middle, and one on top. The pipes, which are made of a durable polyethylene such as PVC or ABS, preferably measure about three feet in length and 8 inches in diameter.

Each pipe 26 has a first end 28 coinciding with a first end of the pyramid, and a second end 30 coinciding with a second end of the pyramid. Half of the pipes are open at the first end 28 and plugged at the second end 30, while the other half of the pipes are plugged at the first end 28 and open at the second end 30, as shown in FIG. 7. This staggering of the entrances to the pipes provides the spawning fish with a greater sense of isolation. The plugs 32 used to close the openings are preferably 3-inch concrete plugs which are held in place by the corrugations in the pipe.

The material used to bundle the pipes 26 in their pyramid configuration is preferably woven plastic strapping 34 having a test strength of at least 300 pounds. Each strap 34 is provided with a buckle 36 formed of UV stabilized polypropylene or polystyrene or metal having a rust-resistant coating.

A third type of fish habitat structure, known as a "Crappie Condo" 14, is illustrated in FIGS. 8-10. The purpose of the "Crappie Condo" 14 is to provide escape and hiding cover for small fish by simulating conditions in natural brush piles. "Crappie Condos" are preferably clustered together in group of about 21. In addition, because of the synergistic effects of having ambush cover and escape cover together, it is recommended that each "Crappie Condo" cluster be located within 20 feet of a "Fish 'N Forest" cluster or other suitable ambush site.

Each "Crappie Condo" 14 comprises a sheet of plastic mesh material rolled into a tube 15 approximately 16" in diameter and four feet in length. The mesh material is preferably a high density polyethylene having the same properties as already described in connection with the "Bass Bungalow" 12. The tube 15 stands on one end so that its longitudinal axis extends perpendicular to the lake bottom, in contrast to the "Bass Bungalow" which extends parallel to the bottom. A cinder block 37 or other weight is press-fit or otherwise mounted in the bottom end of the tube 15 to maintain it in a stable position. The opposite end of the tube 15 is covered by a conical cap 38, which prevents large predatory fish from entering through the top.

The cap 38, shown in detail in FIG. 9, is preferably constructed from an opaque Polyethylene sheet measuring from 0.04 to 0.06 inches thick. The central cone measures six to ten inches high and approximately 21 inches in diameter at the base. A rim 40 extends radially outwardly from the base of the cone. Four pairs of holes 42 are provided at 90 degree intervals along the rim for receiving UV stabilized Nylon fastener ties 44, which secure the cap 38 to the tube. A number of longitudinally extending stiffener ribs or corrugations 46 are formed on the underside of the cone to provide additional rigidity.

Another habitat structure, known as a "Magic Mushroom" 16, is shown in FIG. 12. The optimum location for the "Magic Mushroom" 16, the purpose of which is to provide overhead shade and ambush cover for large predatory fish, is along the edges of natural potemogeton waterweed beds.

The "Magic Mushroom" 16 comprises a conical cap 48 which is substantially identical to the cap 38 of the "Crappie Condo" 16, except that the fastener-receiving holes 42 have been eliminated. The cap 48 is preferably painted black or green to prevent penetration of light. A plug of polyurethane foam 50 is inserted into the underside of the cap 48 to provide buoyancy. A coating 52 is applied to the foam 50 to prevent deterioration.

The cap 48 is tethered to the bottom of the lake by a flexible stem 54 formed of polypropylene. The stem 54 is held in place by a suitable earth anchor 56 such as the type marketed under the name "Duckbill" by Foresight Products, Inc of Commerce City, Colo. The polypropylene stem 54 should have a breaking strength of approximately 200 pounds to withstand the rigors of wind, waves, and fisherman.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

We claim:

1. An artificial habitat structure for use in an aquatic environment having a bottom surface and for providing spawning cover for adult predatory fish, said structure comprising:
   a) a horizontally supported tubular member formed of plastic and including a sidewall surrounding a longitudinal axis extending generally parallel to said bottom surface and having a pair of opposite open ends;
   b) a plurality of openings formed in said sidewall, the dimensions of said openings being selected to allow entrance and exit of fry while preventing entrance of larger predatory fish; and
   c) stabilizing means for securing said tubular member in a stable position on said bottom surface, said stabilizing means comprising a pair of weights mounted in opposite ends of said tube, each of said weights including a cinder block, the clearance between the top of said block and the sidewall of said tubular member being sufficient to allow a selected species of adult spawning fish to enter said tube, while preventing entry of larger species of predatory fish.

2. A habitat structure according to claim 1, wherein said tubular member is formed from high-density, ultraviolet-stabilized polyethylene.

3. A habitat structure according to claim 1, wherein said openings comprise no more than 50% of the total surface area of said tubular member.

4. A habitat structure according to claim 1, wherein said openings are rectangular and the dimensions of said openings are in the range of 1¼" to 1¾" by 2¼" to 2¾".

5. An artificial habitat structure for use in an aquatic environment having a bottom surface and for providing escape and hiding cover for small fish by simulating conditions in a brush pile, said structure comprising:
   a) a vertically supported tubular member having a sidewall surrounding a longitudinal axis, a first end for supporting said tubular member in an upright vertical position on said surface, and a second end opposite said first end;
   b) a plurality of openings formed in said sidewall, the dimensions of said openings being selected to allow entrance and exit of small prey fish while preventing entrance of larger predatory fish; and
   c) stabilizing means for securing said tubular member in a stable position on said bottom surface such that the longitudinal axis of said tubular member is generally perpendicular to said bottom surface, said stabilizing means comprising a weight mounted in the bottom end of said tube, wherein said weight includes a cinder block press-fit into the bottom end of said tube.

6. An artificial habitat structure for use in an aquatic environment having a bottom surface and for providing escape and hiding cover for small fish by simulating conditions in a brush pile, said structure comprising:
   a) a tubular member having a sidewall, a first end for supporting said tubular member in an upright vertical position on said surface, and a second end opposite said first end;
   b) a plurality of openings formed in said sidewall, the dimensions of said openings being selected to allow entrance of small prey fish while preventing entrance of larger prey fish;
   c) stabilizing means for securing said tubular member in a stable position on said bottom surface such that the longitudinal axis of said tubular member is generally perpendicular to said bottom surface; and
   d) closure means secured to the open top end of said tubular member for preventing fish from entering said structure from the top.

7. An artificial fish habitat structure for sheltering selected species of spawning fish in an aquatic environment having a bottom surface, said structure comprising:

a plurality of elongated tubes for simulating darkened cavities, each of said tubes having a continuous, imperforate sidewall, a closed end, and an open end opposite said closed end, said open end being coaxial with said tube and having a diameter selected to allow entry of said selected species while prohibiting entry of larger predatory species; and fastener means secured to said tubes for securing said tubes together in a stacked configuration such that the closed ends of some of the tubes face in the same direction as the open ends of the other of said tubes.

8. A habitat structure according to claim 7, wherein said configuration is selected such that the axes of all of said tubes are parallel to one another and to said bottom surface.

9. A fish habitat structure according to claim 7, wherein said stacked configuration is a pyramid.

10. A fish habitat structure according to claim 7, wherein each of said tubes is corrugated.

11. An artificial fish habitat structure for providing ambush cover for predatory fish in an aquatic environment having a bottom surface, said structure comprising:

buoyant cover means for providing overhead security for said fish, said cover means comprising a conical cap having a tapered outer surface converging upwardly toward the top surface of the water and diverging downwardly toward said bottom surface to form an umbrella-like structure; and connector means for tethering said cover means to said bottom surface.

12. An artificial fish habitat according to claim 11, wherein said connector means comprises a flexible stem having a first end secured to said cover means and a second end anchored to said bottom surface.

13. An artificial fish habitat according to claim 11, wherein said conical cap is filled with foam.

14. A habitat structure for use in an aquatic environment having a bottom surface and for providing escape and hiding cover for small fish by simulating conditions in a brush pile, said structure comprising:

a) a tubular member having a sidewall, a first end for supporting said tubular member in an upright vertical position on said surface, and a second end opposite said first end;

b) a plurality of openings formed in said sidewall, the dimensions of said openings being selected to allow entrance of small prey fish while preventing entry of larger predatory fish;

c) stabilizing means for securing said tubular member in a stable position on said bottom surface such that the longitudinal axis of said tubular member is generally perpendicular to said bottom surface; and d) reinforcement means for enabling said tubular member to retain its shape when subjected to radial pressure, said reinforcement means including i) at least one stiffening ring insertible within the bore of said tubular member; and ii) fastening means removably securable to said stiffening ring and said tubular member for extending through any of said openings in said sidewall to secure said stiffening ring to said tubular member at selectively variable locations anywhere along the length of said tube.

15. A habitat structure according to claim 14, wherein said tubular member is formed of plastic.

16. A habitat structure according to claim 14, wherein said plastic is a high-density, ultra-violet stabilized polyethylene.

17. A habitat structure for use in an aquatic environment having a bottom surface, said structure comprising:

a) a tubular member including an endless sidewall surrounding a longitudinal axis and having a pair of opposed open ends;

b) a plurality of openings formed in said sidewall, the dimensions of said openings being selected to allow entrance of small prey fish while preventing entrance of larger predatory fish;

c) stabilizing means for securing said tubular member in a stable position on said bottom surface; and d) reinforcement means for enabling said tubular member to retain its shape when subjected to radial pressure, said reinforcement means including (i) at least one stiffening ring insertible within the bore of said tubular member; and (ii) fastening means removably securable to said stiffening ring and said tubular member for extending through any of said openings in said sidewall to secure said stiffening ring to said tubular member at selectively variable locations anywhere along the length of said tube.

18. A habitat structure for sheltering selected species of spawning fish in an aquatic environment having a bottom surface, said structure comprising:

a plurality of elongated tubes for simulating darkened cavities, the diameter of said tubes being selected to allow entry of said selected species while prohibiting entry of larger predatory species; and fastener means surrounding said tubes for securing said tubes together in a stacked configuration, said fastener means including at least one strap extending around the stack of tubes.

* * * * *

UNITED STATES PATENT AND TRADEMARK OFFICE
CERTIFICATE OF CORRECTION

PATENT NO. : 5,201,136

DATED : 13 April 1993

INVENTOR(S) : David L. LaMorte, et al.

It is certified that error appears in the above-identified patent and that said Letters Patent is hereby corrected as shown below:

In claim 1, column 6, line 1, replace "opposite" with --opposed--.

Signed and Sealed this

Fourteenth Day of December, 1993

*Attest:*

BRUCE LEHMAN

*Attesting Officer*     *Commissioner of Patents and Trademarks*